(12) United States Patent
Ozaki et al.

(10) Patent No.: US 8,944,241 B2
(45) Date of Patent: *Feb. 3, 2015

(54) CONVEYOR CHAIN

(75) Inventors: Hajime Ozaki, Osaka (JP); Keiko Ota, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 90 days.

This patent is subject to a terminal disclaimer.

(21) Appl. No.: 13/243,998

(22) Filed: Sep. 23, 2011

(65) Prior Publication Data

US 2012/0073938 A1  Mar. 29, 2012

(30) Foreign Application Priority Data

Sep. 28, 2010  (JP) ................................ 2010-217601

(51) Int. Cl.
*B65G 17/46* (2006.01)
*B65G 17/08* (2006.01)

(52) U.S. Cl.
CPC ................ *B65G 17/46* (2013.01); *B65G 17/08* (2013.01)
USPC ..................................................... 198/690.1

(58) Field of Classification Search
CPC ............................... B65G 17/46; B65G 17/08
USPC ..................................................... 198/690.1
See application file for complete search history.

(56) References Cited

U.S. PATENT DOCUMENTS

| | | | | |
|---|---|---|---|---|
| 4,586,601 A * | 5/1986 | Hodlewsky | ................. | 198/690.1 |
| 4,823,939 A * | 4/1989 | Langhans et al. | ............. | 198/805 |
| 5,165,527 A * | 11/1992 | Garbagnati | .................... | 198/805 |
| 5,871,084 A * | 2/1999 | Kasik | .......................... | 198/803.6 |
| 6,290,056 B1 * | 9/2001 | Ootsuki et al. | ................ | 198/619 |
| 6,308,825 B1 * | 10/2001 | Nakamura | .................... | 198/853 |
| 7,581,636 B2 * | 9/2009 | Martinez | .................... | 198/690.1 |
| 7,597,188 B2 * | 10/2009 | Volpi | .......................... | 198/690.1 |
| 7,762,386 B2 * | 7/2010 | Allore | ......................... | 198/803.6 |
| 8,434,613 B2 * | 5/2013 | Ozaki | .......................... | 198/853 |
| 2006/0213752 A1* | 9/2006 | Murakami et al. | ............ | 198/643 |
| 2012/0055758 A1* | 3/2012 | Huttner et al. | ............. | 198/469.1 |

FOREIGN PATENT DOCUMENTS

| DE | 94 01 576 A | 8/1994 |
|---|---|---|
| JP | 08/310384 | 11/1996 |
| JP | 09/275011 | 10/1997 |
| JP | 2004/262600 | 9/2004 |

OTHER PUBLICATIONS

European Search Report for European Application No. 11 17 9868, mailed on Jan. 13, 2012.

* cited by examiner

*Primary Examiner* — Gene Crawford
*Assistant Examiner* — Thomas Randazzo
(74) *Attorney, Agent, or Firm* — Maschoff Brennan

(57) ABSTRACT

A conveyor chain that enables magnet pieces for attracting and retaining articles conveyed on the chain. The magnet pieces are incorporated into synthetic resin link modules without changing a predetermined chain width and dimensioning of other device components. A large number of link rows consisting of a number of synthetic resin link modules are connected together so as to have a predetermined chain width W. At least some of the synthetic resin link modules have magnet storing blind holes which open in the chain width direction from link side surfaces such that a magnet piece can be insertably stored in the magnet storing blind hole and securely enclosed by the link side surface of an adjacent synthetic resin link module in the chain width direction.

10 Claims, 12 Drawing Sheets

US 8,944,241 B2

CONVEYOR CHAIN

CROSS REFERENCE TO RELATED APPLICATIONS

This application claims the foreign priority benefit under Title 35, United States Code, §119 (a)-(d) of Japanese Patent Application No. 2010-217601, filed on Sep. 28, 2010 in the Japan Patent Office, the disclosure of which is herein incorporated by reference in its entirety.

BACKGROUND OF THE INVENTION

1. Field of the Invention

The present invention relates to a conveyor chain for loading and conveying articles and more specifically to a conveyor chain for loading and conveying the articles by magnetically attracting and retaining them even when a conveying surface is sloped or slippery.

2. Related Art

One example of a conveyor chain that is currently used in the art is the conveyor belt 500 shown in FIG. 11. The conveyor belt 500 has link rows each having a predetermined chain width W and composed of link modules 510. The link modules 510 include a loading portion 511 for loading articles M (referred to simply as 'conveyed articles' or as 'articles' hereinafter) and hinge portions 512 projecting respectively from front and rear parts of the loading portion 511. A single link module 510 extends across a chain width direction. The conveyor belt 500 is constructed by linking a large number of link modules 510 in a predetermined array pattern in a chain longitudinal direction by inserting link pins 520 into pin inserting holes 513 formed in the hinge portions 512. Then, the conveyor belt 500 is suspended around driving and driven sprockets S1 and S2 to convey the articles M such as drink bottles, drink cans and the like as disclosed in Japanese Patent Application Laid-open No. 2004-262600 (Col. 6, FIG. 1).

In another conveyor chain currently known in the art, there is a magnet-equipped chain comprising a large number of attracting magnetic units each of which is constructed by coating a surface of a permanent magnet bonded to a thin ferromagnetic yoke by epoxy resin or the like. The magnetic units are disposed on an outer peripheral side of a chain base portion at predetermined intervals to convey magnetically attractive articles by attracting and retaining such articles as is disclosed in Japanese Patent Application Laid-open No. Hei. 9-275011 (Page 8, FIG. 8).

In still another conveyor chain known in the art, a magnetic chain conveyor for conveying cases formed of a magnetic material such as a drink box made of iron is used which has magnets mounted to yokes on both sides in a chain longitudinal direction as disclosed in Japanese Patent Application Laid-open No. Hei. 8-310384 (Col. 3, FIG. 10 (see Patent Document 3 for example).

One problem with each of the conveyer chain shown in FIG. 11, however, is that because the link module 510 for loading the articles M on the loading portion 511 is molded of synthetic resin to exhibit a self-lubricant properties, there is a problem in that it is unable to steadily convey the articles M because they may suddenly fall or slip when a shock is made a conveyor surface or when a component force in a slope direction acting on the articles M exceeds a frictional force of conveying the articles M on a slope, as shown in FIG. 12. Additionally, when a slippery liquid such as soapy water, lubricant oil or others spreads on the link module 510 and the loading surface of the loading portion 511 for loading the articles M of the link module 510 is excessively slippery, there may be other difficulties.

The prior art magnet-equipped chain also problems. That is, a large number of attracting magnetic units are disposed on the outer peripheral surface of the chain base portion which project on both right and left sides of the chain base portion. This means that the chain width must be increased in order to make room for the attracting magnetic units projecting on the right and left side of the chain base portion. The chain also causes such problems for device design that it hinders in dimensioning layouts of a chain guide, driving sprocket and others and that a chain turning radius increases excessively in conveying while turning horizontally.

If the chain base portion is narrowed along with the projecting parts of the attracting magnetic units to solve the abovementioned problems, there arises another problem that chain strength is remarkably weakened.

Still more, because the attracting magnetic units are disposed on the outer peripheral surface of the chain base portion, a radius of bending in a direction opposite from the conveyor surface, i.e., so-called 'back-bend radius', becomes large. As a result, it becomes unable to fully assure a slack even if an intermediate roller such as an idle roller is used to absorb elongation of the chain return side. Then, there are such problems that a frequency of burdens of maintenance for eliminating the elongation of the chain increases and if the chain is left as it is, the magnet-equipped chain bites into the driving sprocket and is cut.

Still more, because the prior art magnet-equipped chain is constructed by melting epoxy resin and the like at high temperature and coating it on the surface of the permanent magnet bonded to the ferromagnetic yokes, the permanent magnet is exposed to the high resin temperature. Then, the permanent magnet decreases its magnetism and cannot exhibit a sufficient attracting and retaining force. Furthermore, because the attracting magnetic unit is constructed by bonding the permanent magnet to the ferromagnetic yoke by an adhesive, the adhesion between the permanent magnet and the ferromagnetic yoke may wear off when used for a long period of time. Then, there are such problems that the permanent magnet may fall out and be damaged and it is unable to stably attract and retain the articles to be conveyed.

Still more, because the magnets in the prior art magnetic chain conveyor are attached to the yokes on the both sides, there are such problems that the magnets may suddenly fall out or are damaged by receiving a shock and others during conveyance and it may become unable to stably convey the articles. Then, it may also cause a problem that broken pieces of the magnets scatter around the conveying area, causing much trouble in terms of the conveyance works.

SUMMARY OF THE INVENTION

Accordingly, the present invention aims at solving the aforementioned prior art problems by providing a conveyor chain that enables magnet pieces for magnetically attracting and retaining articles to be conveyed to be simply and steadily incorporated into synthetic resin link modules without changing a predetermined chain width and dimensioning of other device components. The magnet pieces are able to attract and retain the articles with a sufficient magnetic force while the design of the conveyor chain prevents the magnet pieces from jumping and falling out as would otherwise be caused by vibrations during conveyance.

In order to solve the aforementioned problems, a first aspect of the invention is a conveyor chain comprising link rows disposed in a chain width direction, each having a predetermined chain width and being composed of a plurality of synthetic resin link modules having a loading portion for loading articles to be conveyed and hinge portions projecting respectively from the front and rear parts of the loading portion.

The conveyor chain is constructed in a predetermined array pattern by linking the large number of link rows in a chain longitudinal direction by inserting link pins through pin inserting holes formed through the hinge portions of the link rows.

Then, at least a pair of synthetic resin link modules composing the link row and disposed respectively in the chain width direction have magnet storing blind holes which open in the chain width direction from link side surfaces of the synthetic resin link modules such that magnet pieces are insertably stored in the magnet storing blind holes of the synthetic resin link modules. The magnet pieces magnetically attract and retain the articles while being closed by the link side surfaces of the synthetic resin link module adjacently disposed in the chain width direction.

In a second aspect of the invention, the plurality of synthetic resin link modules composing the link row comprise at least magnetism generating link modules storing the magnet pieces and a driving link module storing no magnet piece and engaging with sprockets.

According to a third aspect of the invention, a thickness of the loading portion between a loading surface for loading the articles and the magnet storing blind hole of the magnetism generating link module is formed to be thinner than a thickness between a back surface of the loading surface, i.e., a surface on an opposite side of the magnetism generating link module from the loading surface, and the magnet storing blind hole.

According to a fourth aspect of the invention, the magnet piece is composed of a square rod having a rectangular shape in section and magnet anchoring portions for anchoring corners of the magnet piece project within the magnet storing blind hole.

Accordingly, the conveyor chain of the invention can not only convey the articles horizontally while loading on a loading surface, but also bring about the following effects by the system configuration peculiar to the invention.

That is, according to the first aspect of the conveyor chain of the invention, because at least the pair of synthetic resin link modules composing the link row and disposed respectively in the chain width direction have magnet storing blind holes which open in the chain width direction from the link side surfaces of the synthetic resin link modules, the magnet pieces can be inserted into the synthetic resin link modules composing the link row having the predetermined chain width from the chain width direction. Then, the magnet pieces for attracting and retaining the articles can be stored reliably and simply within the synthetic resin link modules without changing the size of the predetermined chain width W and dimensioning with the other device components. Still more, because the magnet pieces are stored in the magnet storing blind holes without heating, it becomes possible to prevent thermal demagnetization of the magnet pieces otherwise caused in the prior art magnet-equipped chain and to attract and retain the article with an enough magnetic force.

Then, because the magnet pieces insertably stored in the magnet storing blind holes of the synthetic resin link modules are closed by the link side surfaces of the synthetic resin link module adjacently disposed in the chain width direction, the link side surface of the adjacently disposed synthetic resin link module covers the opening of the magnet storing blind hole and stops the magnet piece from escaping. Then, it becomes possible to reliably prevent the magnet piece from escaping even if vibrations occur up and down and right and left directions during the conveyance of the articles. Thus, the aspects of the invention described herein prevent sudden damage to the magnet piece that otherwise could come into contact with peripheral devices. Hence, aspects of the invention provide the ability to reliably fix the magnet piece without separately requiring a fixing means for fixing the magnet piece such as those used in the prior art magnet-equipped chain.

Still more, because the magnet piece is stored in the synthetic resin link module, it becomes possible to convey the articles upward stably without a slip even if a component force in a slope direction acting on the articles while conveying on the slope exceeds a frictional force or even if a slippery liquid such soapy water, lubricant oil and others spreads on the synthetic resin link module, causing the loading surface of the loading portion to be excessively slippery.

Still more, it becomes possible to realize a smooth driving and conveyance by fully assuring a slack by using an intermediate roller, i.e., an idler roller and the like, that absorbs elongation of the chain on the chain return side to avoid an increase of a radius, i.e., a so-called 'backbend radius' bending in a direction opposite from the conveyor surface, that occurs when a magnet piece is mounted on an outer peripheral surface of a prior art synthetic resin link module.

According to the second aspect of the conveyor chain of the invention, because the plurality of synthetic resin link modules composing the link row comprise at least the magnetism generating link modules storing the magnet pieces and the driving link module storing no magnet piece and engaging with the sprockets, the magnetism generating link modules are not involved in the engagement with the sprocket. Accordingly, it is possible to store the magnet piece of desirable size in the magnet storing blind hole of the magnetism generating link module. Still more, because the driving link module always exists in the respective link row and sequentially engages with the sprockets per link row in conveying the articles, the conveyor chain can convey the articles more stably.

According to the third aspect of the conveyor chain of the invention, because the thickness of the loading portion between the loading surface for loading the articles and the magnet storing blind hole of the magnetism generating link module is formed to be thinner than the thickness between the back surface of the loading surface, i.e., the surface on the opposite side of the magnetism generating link module from the loading surface, and the magnet storing blind hole, the magnet piece stored in the magnet storing blind hole can be closer to the articles on the loading surface. Then, it becomes possible to cause the attracting force of the magnet piece to act strongly on the article and to convey the articles while strongly attracting and retaining the article.

According to the fourth aspect of the conveyor chain of the invention, because the magnet piece is composed of the rod having the rectangular shape in section and the magnet anchoring portions for anchoring the corners of the magnet piece project within the magnet storing blind hole, a gap is assured in most parts between the magnet piece and the magnet storing blind hole in the state in which the magnet piece is anchored by the magnet anchoring portions of the magnet storing blind hole even if a thin part formed between the magnet storing blind hole and the conveyor surface after injection-molding the magnetism generating link module sink and deforms toward the magnet storing blind hole. Accordingly, the magnet piece can be readily stored in the magnet storing blind hole while not contacting across the perimeter of the magnet piece and the magnet storing blind hole and partially sliding with each other.

BEST MODE FOR CARRYING OUT THE INVENTION

First Embodiment

A first embodiment of a conveyor chain of the invention will be explained below with reference to the drawings.

Figure 1:
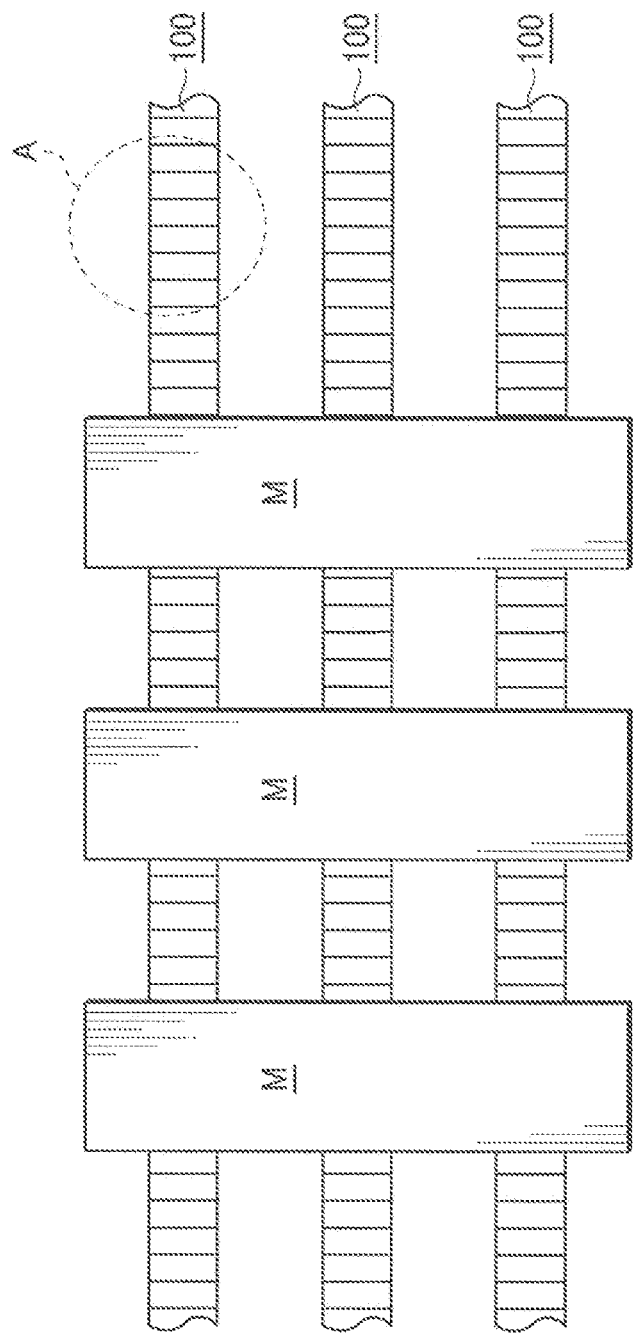
FIG. 1 is a schematic diagram showing a mode of use of a conveyor chain of a first embodiment of the invention.
Figure 2:
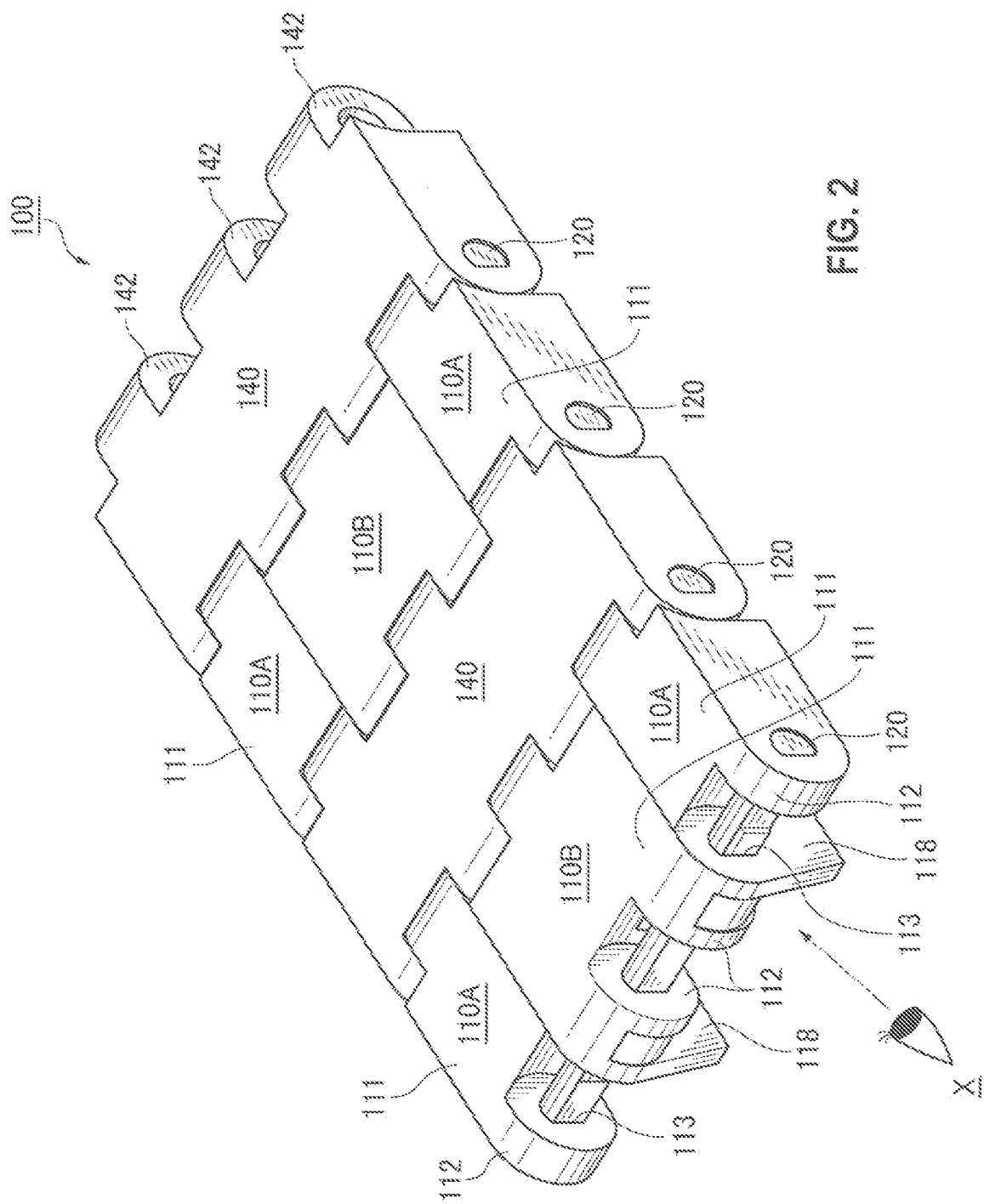
FIG. 2 is an enlarged view of a part A of the conveyor chain of the first embodiment shown in FIG. 1.
Figure 3:
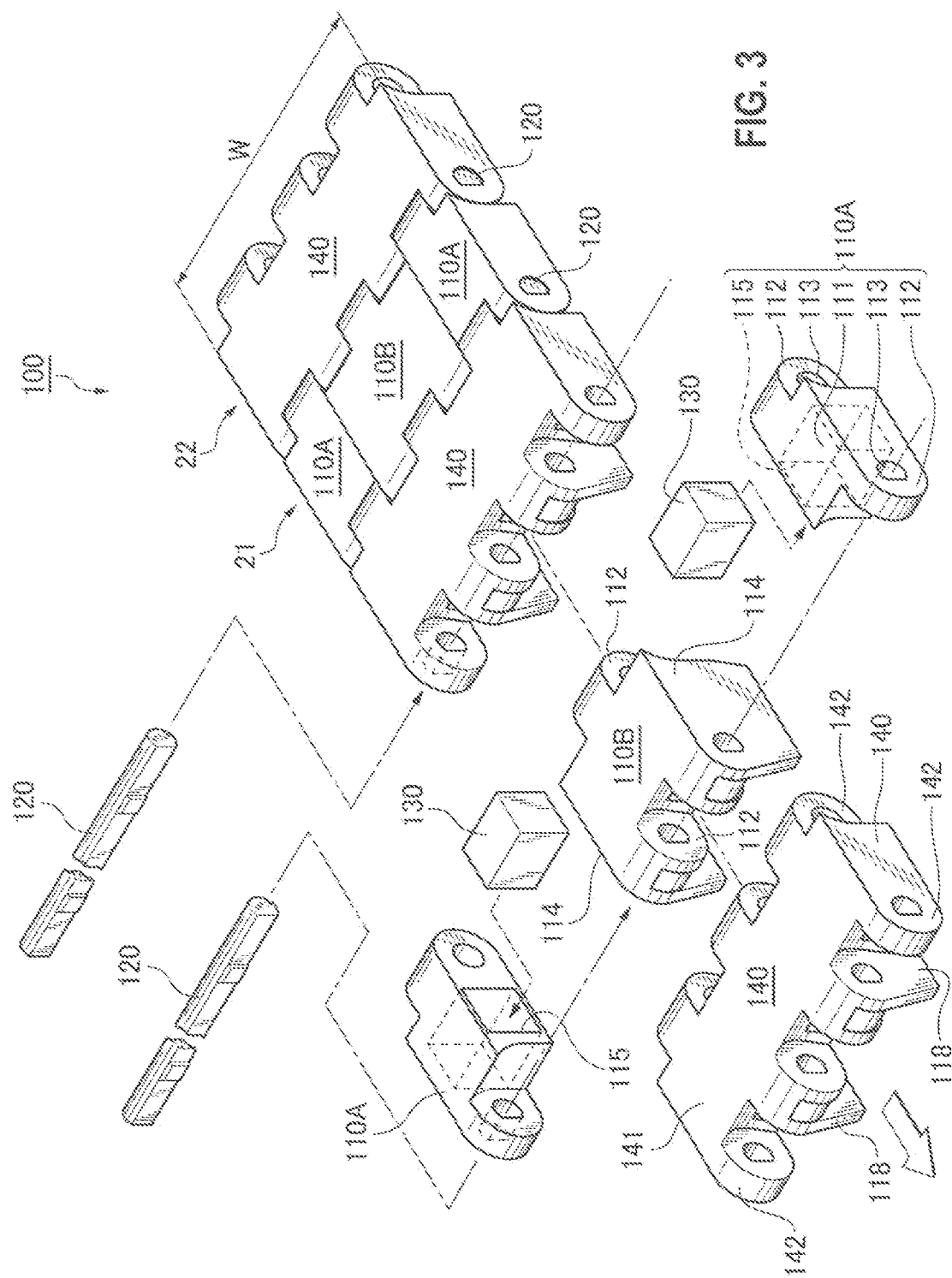
FIG. 3 is an assembly exploded view of the conveyor chain of the first embodiment of the invention.
Figure 4:
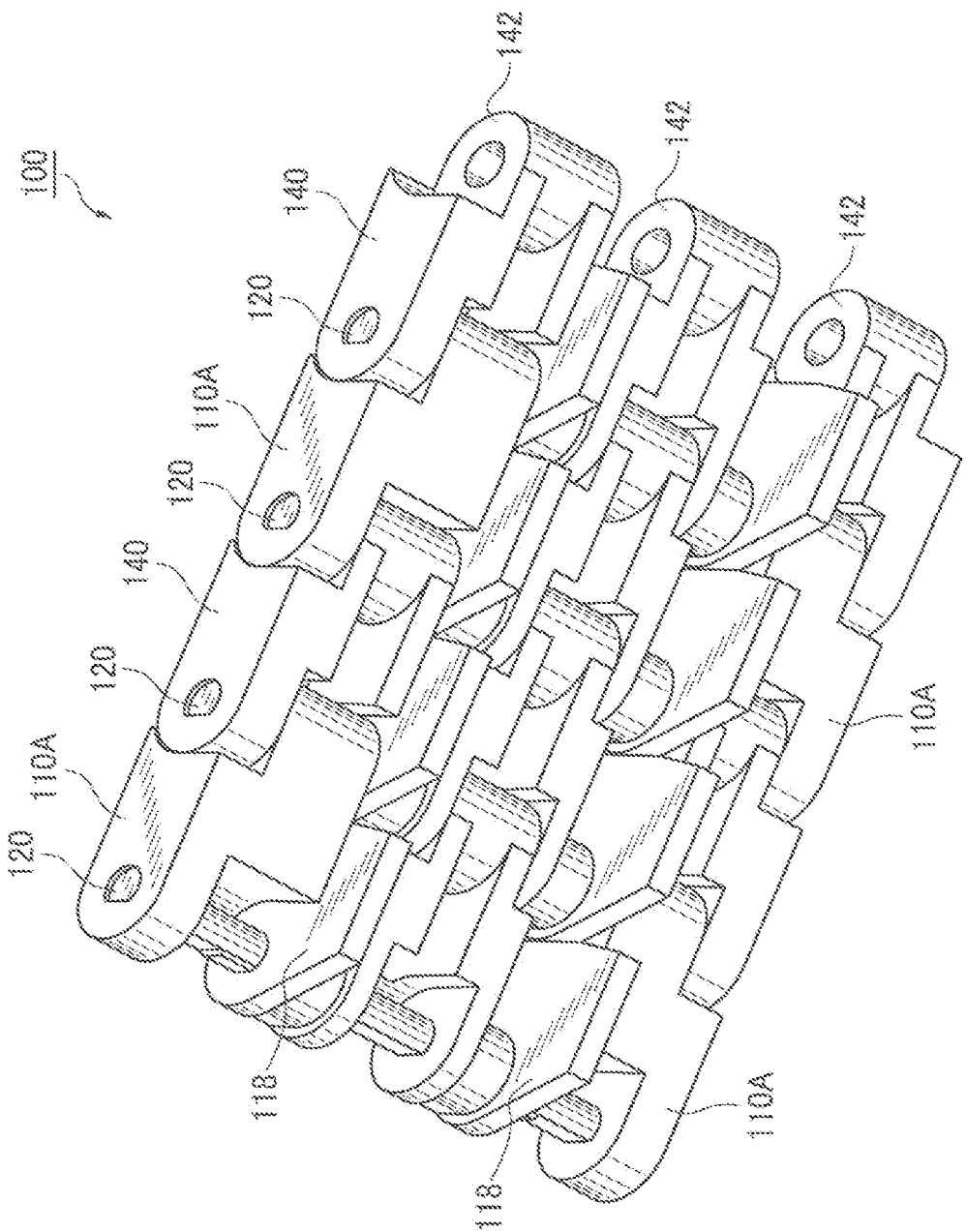
FIG. 4 is a perspective view of the conveyor chain seen from a view point X on the back of the chain shown in FIG. 2.
Figure 5:
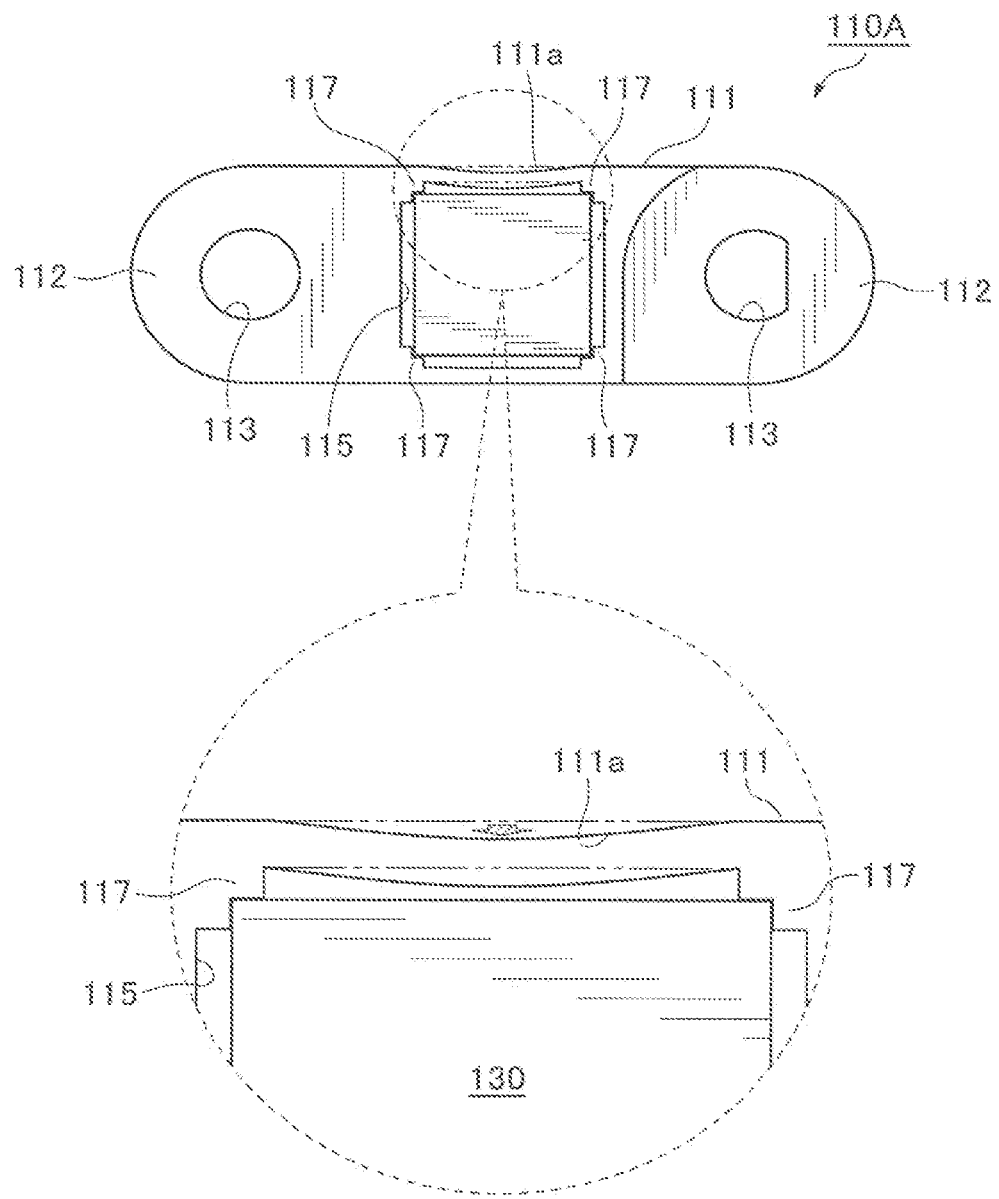
FIG. 5 is a side view seen from a magnet piece inserting side of a magnetism generating link module shown in FIG. 2.
Figure 6:
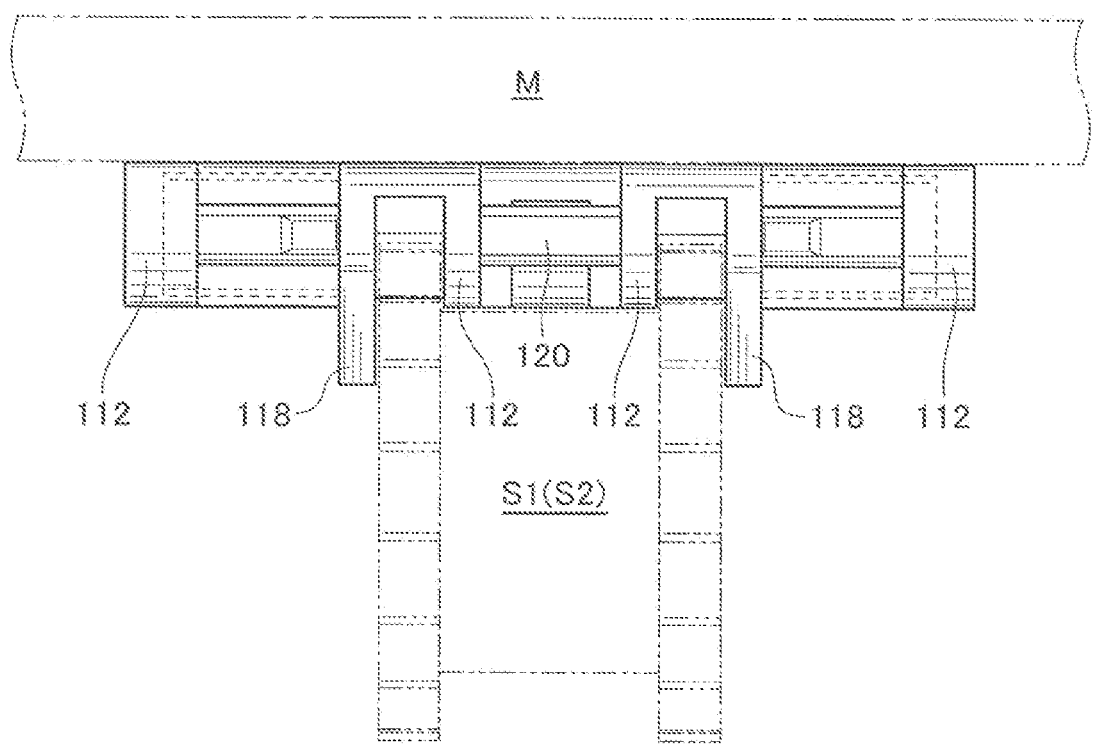
FIG. 6 is a front view of the conveyor chain shown in FIG. 2.
Figure 7:
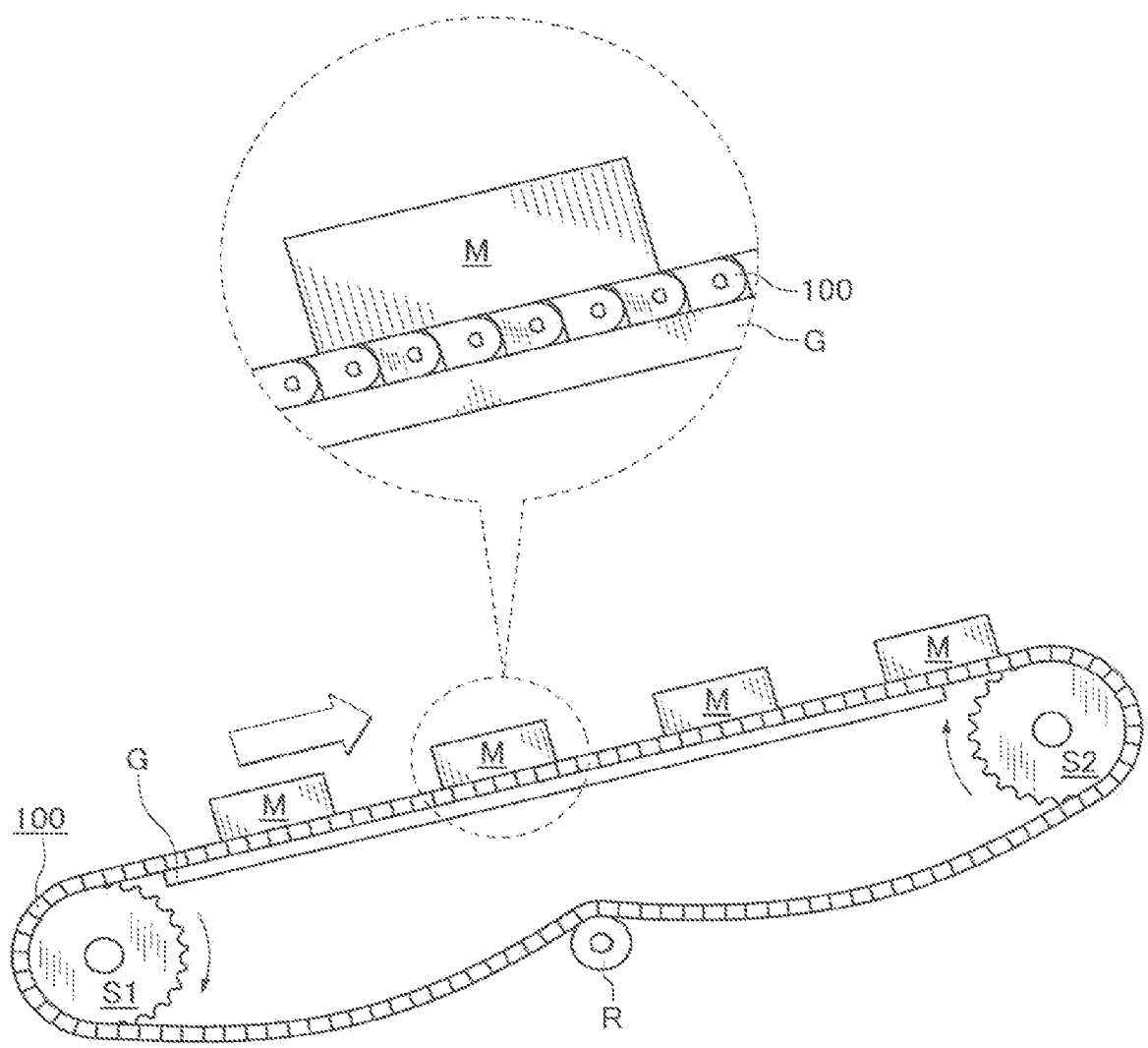
FIG. 7 is an operational view of the conveyor chain shown in FIG. 1 in conveying articles on a slope.
Figure 8:
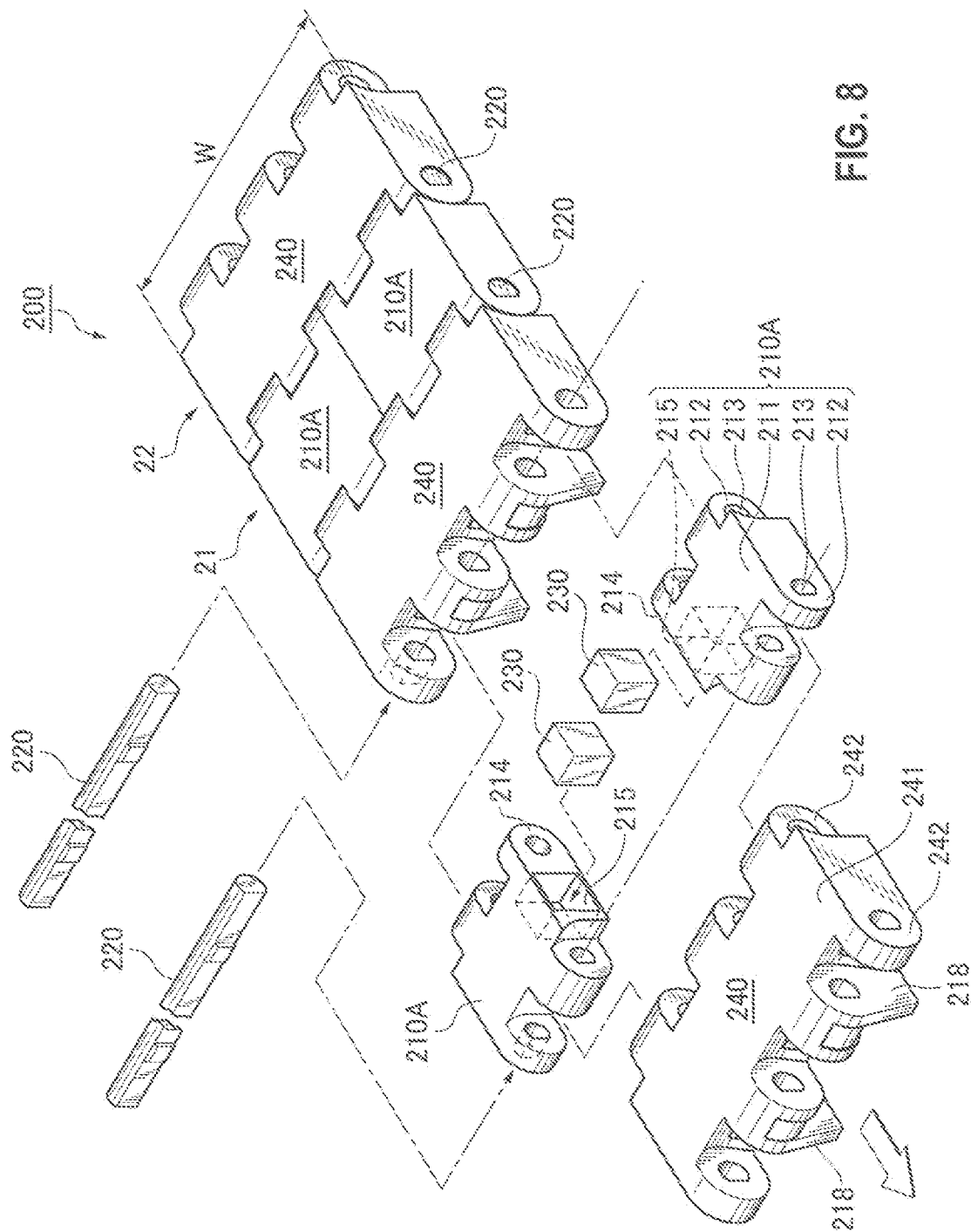
FIG. 8 is an assembly exploded view of a conveyor chain of a second embodiment of the invention.
Figure 9:
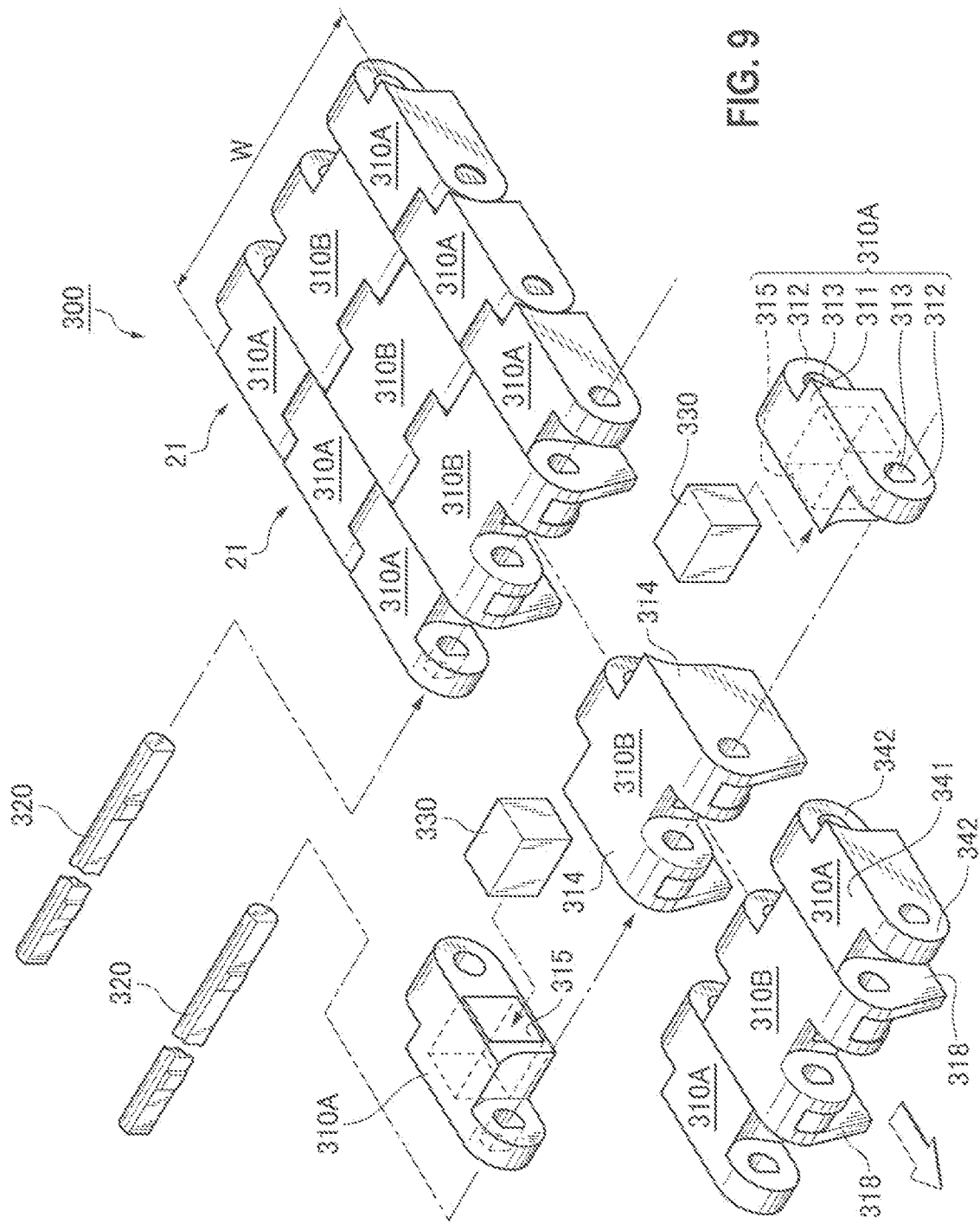
FIG. 9 is an assembly exploded view of a conveyor chain of a third embodiment of the invention.
Figure 10:
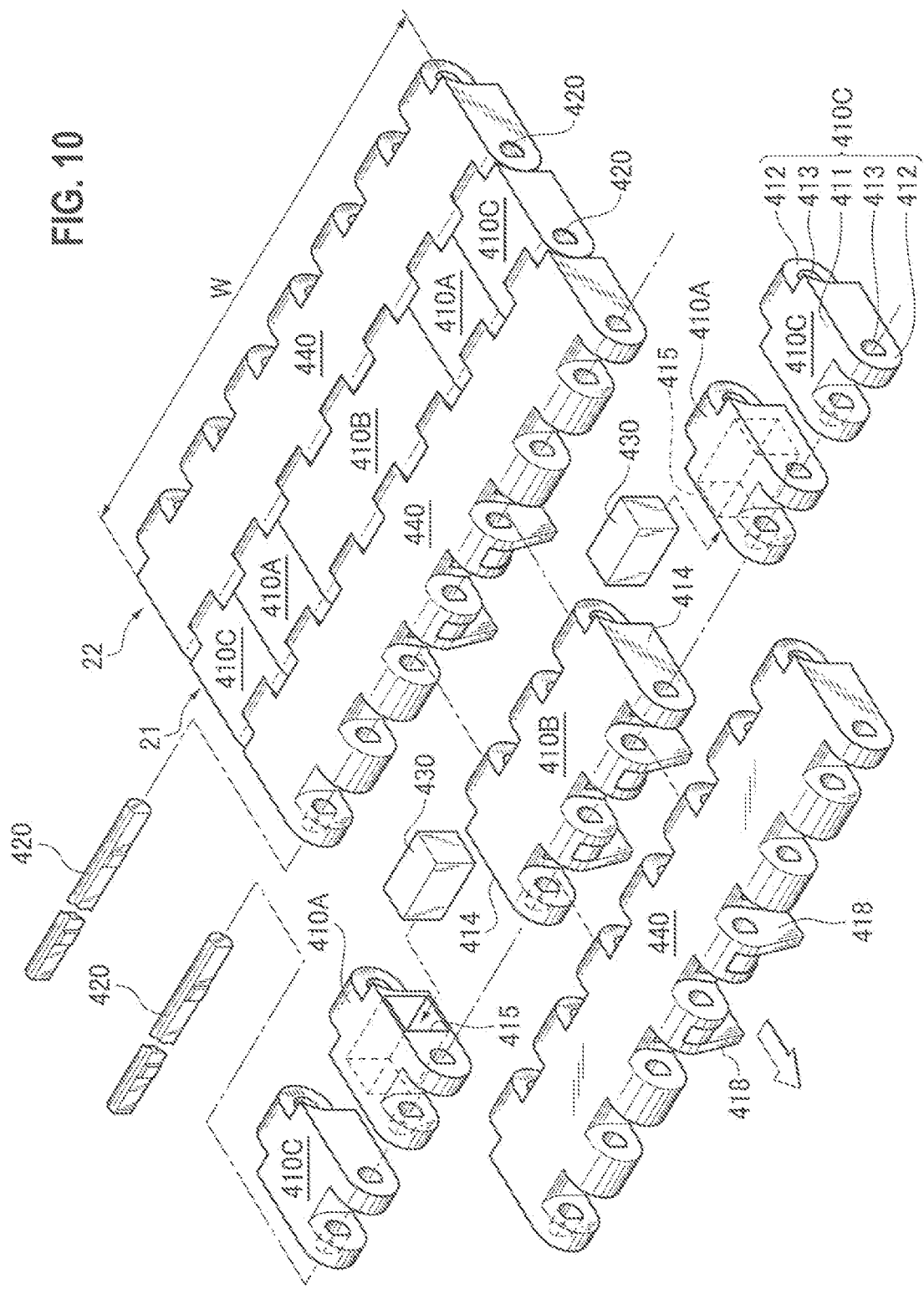
FIG. 10 is an assembly exploded view of a conveyor chain of a fourth embodiment of the invention.
Figure 11:
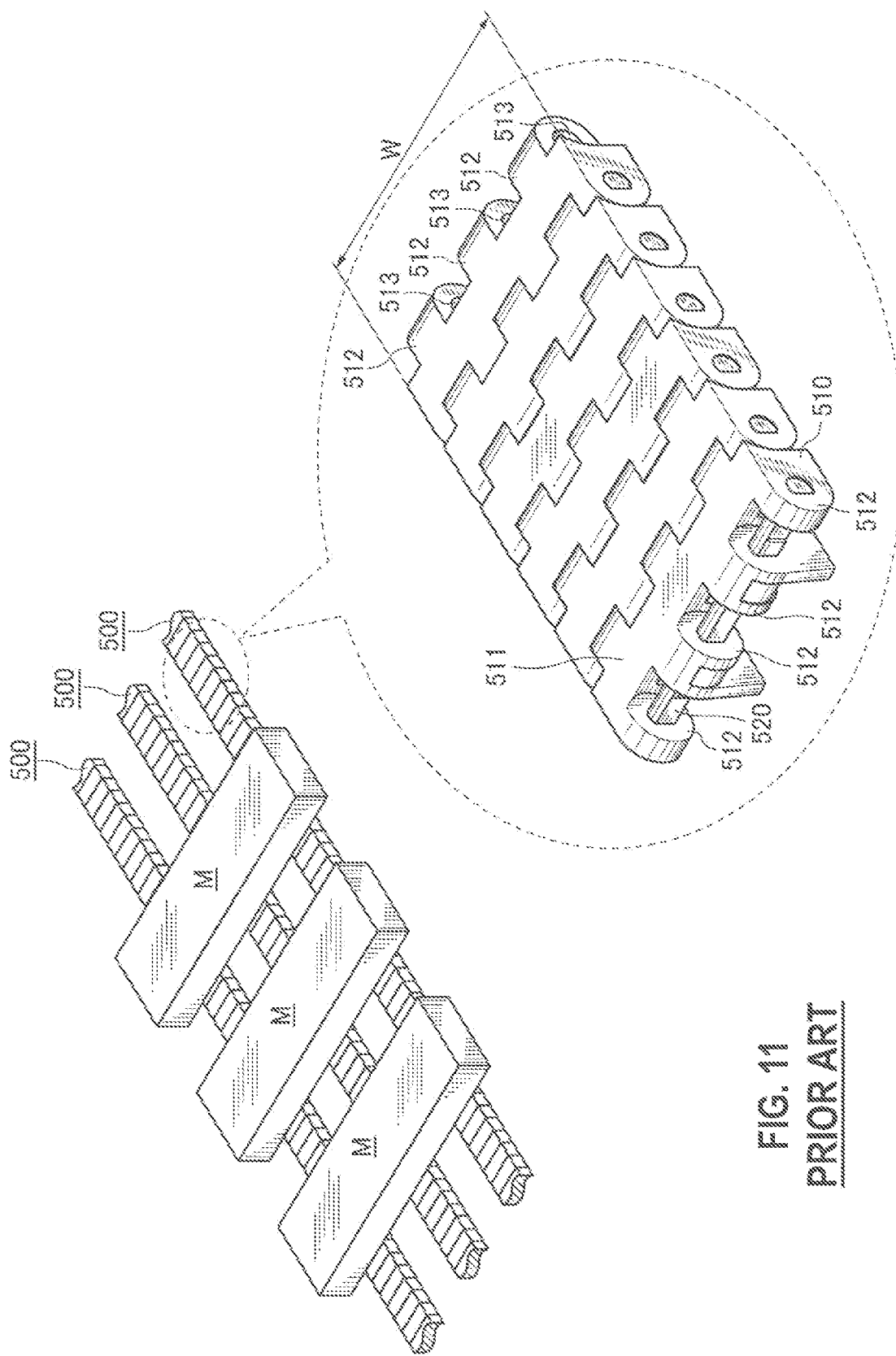
FIG. 11 is a diagram showing a mode of use of a prior art conveyor belt and a partially enlarged view thereof.
Figure 12:
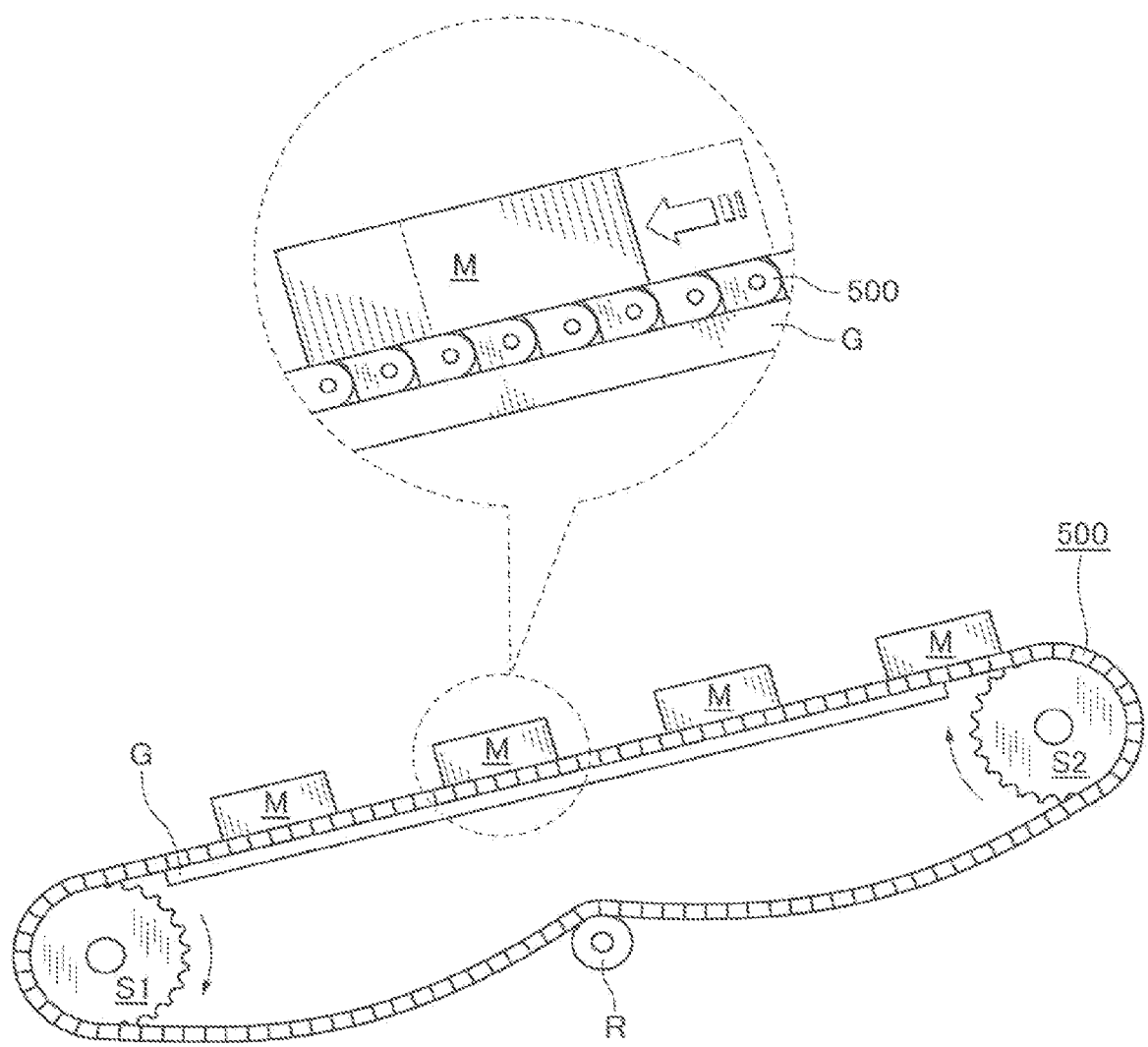
FIG. 12 is an operational view of the conveyor chain shown in FIG. 11 in conveying articles on a slope.

Here, FIG. 1 is a schematic diagram showing a mode of use of a conveyor chain of a first embodiment of the invention, FIG. 2 is an enlarged view of a part A of the conveyor chain of the first embodiment shown in FIG. 1, FIG. 3 is an assembly exploded view of the conveyor chain of the first embodiment of the invention, FIG. 4 is a perspective view of the conveyor chain seen from a view point X on the back of the chain shown in FIG. 2, FIG. 5 is a side view seen from a magnet piece inserting side of a magnetism generating link module shown in FIG. 2, FIG. 6 is a front view of the conveyor chain shown in FIG. 2, FIG. 7 is an operational view of the conveyor chain shown in FIG. 1 in conveying articles on a slope, FIG. 8 is an assembly exploded view of a conveyor chain of a second embodiment of the invention, FIG. 9 is an assembly exploded view of a conveyor chain of a third embodiment of the invention and FIG. 10 is an assembly exploded view of a conveyor chain of a fourth embodiment of the invention.

According to the first embodiment of the invention, three conveyor chains 100 are arrayed in parallel in a line width direction of a conveyor line as shown in FIG. 1 and are used in a conveying system for conveying long articles M which are long in the conveying line width direction upward on a slope.

As shown in FIGS. 2 and 3, each conveyor chain 100 of the first embodiment of the invention comprises a plurality of synthetic resin link modules 110 each having a loading portion 111 for loading articles M and hinge portions 112 projecting respectively from the front and rear parts of the loading portion 111, and link pins 120. The conveyor chain is constructed by linking the large number of synthetic resin link modules 110 in a chain longitudinal direction in a predetermined array pattern by inserting link pins 120 through pin inserting holes 113 formed through the hinge portions 112 of the synthetic resin link modules 110.

The conveyor chain 100 of the embodiment described above is arrayed in the array pattern so that link rows L1 that exhibit the magnetic force for attracting and retaining the articles M are arrayed alternatively with link rows L2 that exhibit no magnetic force for attracting and retaining the articles M.

The link row L1 that exhibits the magnetic force for attracting and retaining the articles M is composed of three synthetic resin link modules 110 in total arrayed to have a predetermined chain width W. That is, the three synthetic resin link modules are two magnetism generating link modules 110A disposed symmetrically in the chain width direction while storing magnet pieces 130 and one driving link module 110B disposed in a center area in the chain width direction so as to engage with sprockets S1 and S2 (see FIG. 6) while having no magnet piece.

Meanwhile, the link row L2 that exhibits no magnetic force for attracting and retaining the articles M is constructed to have the predetermined chain width W by one synthetic resin link module 140 that engages with the sprockets S1 and S2 at a center area thereof in the chain width direction while storing no magnet piece.

As shown in FIG. 3, the link rows L1 that exhibit the magnetic force for attracting and retaining the articles M and the link rows L2 that exhibit no magnetic force for attracting and retaining the articles M are linked while facing in an offset state with each other by alternately interlocking the hinge portions 112 projecting respectively from the front and rear parts of the loading portions 111 of the magnetism generating link modules 110A and the driving link modules 110B composing the link rows L1 with the hinge portions 142 projecting from the front and rear parts of the loading portions 141 of the single synthetic resin link module 140 composing the link row L2 through an intermediary of the link pins 120.

Thereby, the hinge area in which the synthetic resin link modules 110 and the adjacent link modules 140 are articularly linked with each other avoids an increase of the radius of the so-called 'backbend radius' bending in a direction opposite from the conveyor surface.

Next, a specific configuration of the magnetism generating link module 110A, which is the most characteristic part of the conveyor chain 100 of the present embodiment will be explained in detail with reference to FIGS. 2 through 4.

The magnetism generating link module 110A described above has a magnet storing blind hole 115 having a rectangular shape in section and opening in the chain width direction from a link side surface 114 of the driving link module 110B. A magnet piece 130 that attracts and retains the articles M is insertably stored in the magnet storing blind hole 115.

Thereby, the magnet piece 130 can be inserted into the magnetism generating link module 110A composing the link row L1 having the predetermined chain width in the chain width direction and can be stored in the magnet storing blind hole 115 without requiring a heating process. The stored magnet piece 130 reliably attracts and retains the articles M.

Still more, because the magnet piece 130 is stored in, i.e., built in, the magnet storing blind hole 115, it is not necessary to enlarge the outer shape of the magnetism generating link module 110A.

It is noted that the magnet piece 130 stored in the magnet storing blind hole 115 is composed of a square rod having a rectangular shape in section and presenting a ferrite structure that attracts and retains the articles M by a magnetic force.

Then, the magnet piece 130 insertably stored in the magnetism generating link module 110A is closed by the link side surface 114 of the driving link module 110B adjacently disposed in the chain width direction as shown in FIG. 3.

Thereby, the link side surface 114 of the driving link module 110B adjacently disposed to the magnetism generating link module 110A covers the opening of the magnet storing blind hole 115 and stops the magnet piece 130 from escaping.

Still more, as shown in FIG. 5, a thickness of the loading portion 111 between a loading surface 111a for loading the articles M and the magnet storing blind hole 115 of the magnetism generating link module 110A is formed to be thinner than a thickness between a back surface of the loading surface 111a, i.e., a surface on an opposite side of the magnetism generating link module 110A from the loading surface 111a and the magnet storing blind hole 115.

Thereby, the magnet piece 130 stored in the magnet storing blind hole 115 becomes closer to the articles M on the loading surface 111a and exhibits the magnetic force effectively.

Because the part between the magnet storing blind hole 115 and the loading surface 111a is formed to be thin as described above, the thin part may deform to an inner surface side of the magnet storing blind hole 115 due to delayed cooling after injection molding. Then, magnet anchoring portions 117 that anchor corners of the magnet piece 130 are provided so as to project respectively at four corners in the magnet storing blind hole 115.

That is, each magnet anchoring portion 117 has W-shaped inner wall surfaces in section. Then, the magnet piece 130 is fixed in the magnet storing blind hole 115 by the W-shaped inner wall surface in section of the magnet anchoring portion 117 that anchors the corner of the magnet piece 130.

Thereby, even if the thin part formed between the magnet storing blind hole 115 and the loading surface 111a after injection-molding the magnetism generating link module 110A sinks into the magnet storing blind hole 115, a gap is assured in most regions between the magnet piece 130 and the magnet storing blind hole 115 while fixing the magnet piece 130 by the magnet anchoring portions 117 of the magnet storing blind hole 115.

Next, a mode of use using the conveyor chain 100 of the present embodiment will be explained in detail with reference to FIGS. 1, 6 and 7.

That is, the conveyor chains of the embodiment provided on the both sides of the conveyor line are arrayed respectively in parallel in the line width direction of the conveyor line as shown in FIG. 1 and are suspended and driven between the driving and driven sprockets S1 and S2 as shown in FIG. 1 to convey the articles M upward in the slope.

It is noted that although three conveyor chains 100 of the embodiment are arrayed respectively in parallel in the line width direction of the conveyor line in the mode of use of the present embodiment as shown in FIG. 1, the prior art conveyor belt 500 constructed by linking a large number of link modules having no magnet by means of link pins may be interposed between the two conveyor chains 100.

FIG. 6 shows ribs 118 projecting from the back of the link side surface 114 to restrict positional displacement of the conveyor chains in the chain width direction otherwise caused when the conveyor chains 100 of the embodiment engage with the driving and driven sprockets S1 and S2.

FIG. 7 also shows a guide rail G provided along the conveyor line to guide travel of the conveyor chain 100 of the embodiment and an intermediate roller R, i.e., an idler roller, provided on the return side of the conveyor chain 100 to assure a deflection that absorbs elongation of the conveyor chain 100 of the embodiment.

According to the conveyor chain 100 of the embodiment thus obtained, because the pair of magnetism generating link modules 110A disposed symmetrically in the chain width direction while composing the link row L1 have the magnet storing blind holes 115 opening in the chain width direction from the link side surface 114 of the magnetism generating link module 110A, the magnet piece 130 can be stored reliably and simply within the magnetism generating link module 110A without changing the size of the predetermined chain width W and dimensioning with the other device components.

Still more, because the magnet piece 130 insertably stored in the magnet storing blind hole 115 of the magnetism generating link module 110A is closed by the link side surface 114 of the driving link module 110B adjacently disposed in the chain width direction, it becomes possible to reliably prevent the magnet piece 130 from falling out even if vibrations occur up and down and right and left directions during the conveyance of the articles, to thus prevent a sudden damage of the magnet piece 130 that otherwise contacts with the articles M, peripheral devices and others and to reliably fix the magnet piece 130 without separately using a fixing means for fixing the magnet piece 130 such as those used in magnet-equipped chain of the prior art.

Still more, because the magnet piece 130 attracting and retaining the articles M is stored in the magnet storing blind hole 115, it becomes possible to convey the articles M upward stably without a slip as shown in FIG. 7 even if a component force in a slope direction acting on the articles M exceeds a frictional force or even if a slippery liquid such soapy water, lubricant oil and others spreads on the magnetism generating link module 110A and the loading surface of the loading portion 111.

Still more, because the thickness of the loading portion 111 between the loading surface 111a for loading the articles M and the magnet storing blind hole 115 of the magnetism generating link module 110A is formed to be thinner than the thickness between the back surface of the loading surface 111a, i.e., the surface on the opposite side of the magnetism generating link module 110A from the loading surface 111a, and the magnet storing blind hole 115 as shown in FIG. 5, the attracting force of the magnet piece 130 acts more strongly on the articles M, meaning that the articles M can be more securely conveyed.

Furthermore, because the magnet piece 130 is composed of the rod having a rectangularly shaped cross-section and because the magnet anchoring portions 117 for anchoring the corners of the magnet piece 130 project within the magnet storing blind hole 115, the magnet piece 130 can be readily inserted and stored in the magnet storing blind hole 115 without contacting a perimeter of the magnet piece 130 with the magnet storing blind hole 115. Thus, the advantageous effects of the invention are remarkable.

Second Embodiment

A conveyor chain 200 of a second embodiment of the invention will be explained next with reference to FIG. 8.

Similarly to the conveyor chain 100 shown in FIG. 1, the conveyor chains 200 as shown in FIG. 8 are also arrayed respectively in parallel in the line width direction of the conveyor line and convey articles M which are long in the conveying line width direction upward on a slope.

That is, as shown in FIG. 8, the conveyor chain 200 of the second embodiment of the invention comprises a plurality of synthetic resin link modules 210 each having a loading portion 211 for loading the articles M and hinge portions 212 projecting from the front and rear parts of the loading portion 211. The conveyor chain is constructed by linking the large number of synthetic resin link modules in the chain longitudinal direction in a predetermined array pattern by inserting link pins 220 through pin inserting holes 213 formed through the hinge portions 212 of these synthetic resin link modules 210.

The conveyor chain 200 of the embodiment described above is arrayed in the array pattern so that link rows L1 that exhibit the magnetic force for attracting and retaining the articles M are composed of synthetic resin link modules 210, i.e., two magnetism generating link modules 210A storing magnet pieces 230 and disposed symmetrically in the chain width direction and engaging with the sprockets (not shown), within the predetermined chain width W.

Meanwhile, a link row L2 that exhibits no magnetic force for attracting and retaining the articles M is composed of a single synthetic resin link module 240 which does not store a magnet piece 230. The link module 240 engages with the sprockets (not shown) within the predetermined chain width W.

When the conveyor chain 200 of the second embodiment shown in FIG. 8 is compared with the conveyor chain 100 of the first embodiment described above, only the structure of the parts of the link row L1 exhibiting the magnetic force for attracting and retaining the articles M is different and the structure of the other parts are not basically different at all. Therefore, the same or corresponding parts of the conveyor chain 200 with those of the conveyor chain 100 of the first embodiment will be denoted by corresponding reference numerals in 200's and an overlapped explanation thereof will be omitted here.

Accordingly, because link side surfaces 224 of the magnetism generating link modules 210A are disposed so as to face with each other in the chain width direction in the conveyor chain 200 of the second embodiment, the magnet piece 230 stored in the magnet storing blind hole 215 of the magnetism generating link module 210A is steadily covered.

According to the conveyor chain 200 of the second embodiment thus obtained, because the pair of magnetism generating link modules 210A disposed symmetrically in the chain width direction while composing the link row L1 have the magnet storing blind holes 215 opening in the chain width direction from the link side surface 214 of the magnetism generating link module 210A, the magnet piece 230 can be stored reliably and simply within the magnetism generating link module 210A without changing the size of the predetermined chain width W and dimensioning with the other device components. Thus, the conveyor chain 200 of the present embodiment has not only the identical effects with the conveyor chain 100 of the first embodiment, but also has such an effect that because the magnet pieces 230 are disposed around the center in the chain width direction and exhibit their attracting and retaining force more, it becomes possible to avoid a bias of the force attracting and retaining the articles M. Thus, the advantageous effects of the conveyor chain of the second embodiment are remarkable.

Third Embodiment a conveyor chain 300 of a third embodiment of the invention will be explained next with reference to FIG. 9.

Similarly to the conveyor chain 100 shown in FIG. 1, the conveyor chains 300 as shown in FIG. 9 are also arrayed respectively in parallel in the line width direction of the conveyor line and convey specifically long articles M which are long in the conveying line width direction upward on a slope.

That is, as shown in FIG. 9, the conveyor chain 300 of the third embodiment of the invention provided respectively in the conveyor line comprises a plurality of synthetic resin link modules 310 each having a loading portion 311 for loading the articles M and hinge portions 312 projecting from the front and rear parts of the loading portion 311. The conveyor chain is constructed by linking the large number of synthetic resin link modules in the chain longitudinal direction in a predetermined array pattern by inserting link pins 320 through pin inserting holes 313 formed through the hinge portions 312 of these synthetic resin link modules 310.

That is, in the conveyor chain 300 of the embodiment described above, the synthetic resin link modules are arrayed in the array pattern in which only link rows L1 that exhibit the magnetic force for attracting and retaining the articles M are arrayed. Here, the link row L1 is composed of two magnetism generating link modules 310A storing the magnet pieces 330 and disposed symmetrically in the chain width direction and one driving link module 310B which does not store a magnet piece 330. The modules 310B engage with the sprockets (not shown) and are disposed at the center area in the chain width direction, i.e., three synthetic resin link modules 310 in total, within the predetermined chain width W.

When the conveyor chain 300 of the second embodiment shown in FIG. 9 is compared with the conveyor chain 100 of the first embodiment described above, only the structure of the parts of the link row L2 exhibiting no magnetic force for attracting and retaining the articles M is reduced and the structure of the other parts are not basically different at all. Therefore, the same or corresponding parts of the conveyor chain 300 with those of the conveyor chain 100 of the first embodiment will be denoted by corresponding reference numerals in 300's and an overlapped explanation thereof will be omitted here.

According to the conveyor chain 300 of the third embodiment thus obtained, because the pair of magnetism generating link modules 310A disposed symmetrically in the link row L1 have the magnet storing blind holes 315 opening in the chain width direction from the link side surface 314 of the magnetism generating link module 310A, the magnet piece 330 can be stored reliably and simply within the magnetism generating link module 310A without changing the size of the predetermined chain width W and dimensioning with the other device components. Thus, the conveyor chain 300 of the present embodiment has not only the identical effects with the conveyor chain 100 of the first embodiment, but also has such an effect that because only the link rows L1 that exhibit the magnetic force for attracting and retaining the articles M are arrayed consecutively in the chain longitudinal direction, the conveyor chain 300 can exhibit the attracting and retaining force smoothly without causing a attracting time lag against the articles M. Thus, the advantageous effects of the conveyor chain of the second embodiment are remarkable.

Fourth Embodiment

A conveyor chain 400 of a fourth embodiment of the invention will be explained next with reference to FIG. 10.

Similarly to the conveyor chain 100 shown in FIG. 1, the conveyor chains 400 as shown in FIG. 10 are also arrayed respectively in parallel in the line width direction of the conveyor line and convey articles M which are long in the conveying line width direction upward on a slope.

That is, as shown in FIG. 10, the conveyor chain 400 of the fourth embodiment of the invention comprises a plurality of synthetic resin link modules 410 each having a loading portion 411 for loading the articles M and hinge portions 412 projecting from the front and rear parts of the loading portion 411. The conveyor chain is constructed by linking the large number of synthetic resin link modules in the chain longitudinal direction in a predetermined array pattern by inserting link pins 420 through pin inserting holes 413 formed through the hinge portions 412 of these synthetic resin link modules 410.

The conveyor chain 400 of the embodiment described above is arrayed in the array pattern in which link rows L1 that exhibit the magnetic force for attracting and retaining the articles M are arrayed alternatively with link rows L2 that exhibit no magnetic force for attracting and retaining the articles M.

The link row L1 that exhibits the magnetic force for attracting and retaining the articles M is composed of two magnetism generating link modules 410A respectively storing magnet pieces 430 and disposed symmetrically in the chain width direction along with one wide driving link module 410B which does not store a magnet piece 430. The driving link module 410B engages with the sprockets (not shown) and is disposed at the center area in the chain width direction. Two narrow extended link modules 410C which also do not store a magnet piece 430 are disposed in the outermost areas in the chain width direction. As such, in the chain width direction W there are five synthetic resin link modules 410 in total.

Meanwhile, a link row L2 that exhibits no magnetic force for attracting and retaining the articles M is composed of a single synthetic resin link module 440 which does not store a magnet piece 430 and which engages with the sprockets S1 and S2 at the center area in the chain width direction within the predetermined chain width W.

The link rows L1 that exhibit the magnetic force for attracting and retaining the articles M and the link rows L2 that exhibit no magnetic force for attracting and retaining the articles M are linked while facing in an offset state with each other. The link rows L1 and L2 are linked by alternately interlocking the hinge portions 412 projecting from the front and rear parts of the loading portions 411 of the magnetism generating link modules 410A, the driving link module 410B and the extended link modules 410C composing the link row L1 with hinge portions 442 projecting from the front and rear parts of the loading portions 441 of the single synthetic resin link module 440 composing the link row L2 through an intermediary of the link pins 420.

Similar to the first embodiment described above, the magnet piece 430 insertably stored in the magnetism generating link module 410A is closed by a link side surface 414 of the wide driving link module 410B adjacently disposed in the chain width direction.

The link side surface 414 of the adjacently disposed driving link module 410B covers the opening of the magnet storing blind hole 415 and stops the magnet piece 430 from falling out.

When the conveyor chain 400 of the fourth embodiment shown in FIG. 10 is compared with the conveyor chain 100 of the first embodiment described above, only the structure of the parts of the link row L1 exhibiting the magnetic force for attracting and retaining the articles M is different and the structure of the other parts are not basically different at all. Therefore, the same or corresponding parts of the conveyor chain 400 with those of the conveyor chain 100 of the first embodiment will be denoted by corresponding reference numerals in 400's and an overlapped explanation thereof will be omitted here.

Similar to the advantageous effects brought about by the conveyor chain 100 of the first embodiment described above, the conveyor chain 400 of the present embodiment thus obtained brings about the following effects. That is, because the magnet pieces 430 are stored in the plurality of synthetic resin link modules, i.e., the magnetism generating link modules 410A, composing the link row having the predetermined chain width W, the magnet pieces 430 that attract and retain the articles M by their magnetic force can be stored reliably and simply within the magnetism generating link modules 410A without changing the size of the predetermined chain width W and dimensioning with the other device components. Still more, because the magnetism generating link module 410A stores the oblong rectangular parallelepiped magnet piece 430 in the magnet storing blind hole 415 without exposure thereof, it is possible to reliably prevent the magnet piece 430 from falling out even if vibration is generated in the up and down and right and left directions while conveying the article. This also prevents the magnet piece 430 from being suddenly damaged by contacting with peripheral devices. Thus, the advantageous effects of the present embodiment are remarkable.

The specific mode of the conveyor chain of the present invention may take any mode without departing from the meaning and scope of the claims.

For example, the specific material of the synthetic resin link module used in the conveyor chain of the invention may be any material as long as it is a synthetic resin having favorable mechanical characteristics and molding precision. For example, it may be any one of polyamide resin, polyester resin, polyacrylic resin, polyacetal resin, polyvinyl chloride resin, polystyrene resin and the like.

Still more, the specific shape of the synthetic resin link module may be any shape as long as it has a shape that comprises the loading portion for loading the articles and the hinge portions projecting respectively from the front and rear parts of the loading portion and that allows a large number of synthetic resin link modules to be linked in the chain longitudinal direction by inserting the link pins through the pin inserting holes formed in the hinge portions.

The specific number of the hinge portions disposed in the link row composed of the synthetic resin link modules may be any number as long as it allows the respective hinge portions of the link rows to be linked together in the chain longitudinal direction while facing each other in the offset state and to be stably linked in the chain width direction. For example, the link row may have four hinge portions in the front part of the synthetic resin link module and have three hinge portions in the rear part of the synthetic resin link module. The link row may have five or more hinge portions in the front part of the synthetic resin link module and four or more hinge portions in the rear part of the synthetic resin link module.

The specific array pattern in the chain longitudinal direction of the synthetic resin link modules having the magnet storing blind holes used in the conveyor chain of the invention may be an array pattern in which the synthetic resin link modules having the magnet storing blind holes are sequentially disposed consecutively in the chain longitudinal direction or may be an array pattern in which the synthetic resin link modules having the magnet storing blind holes are disposed intermittently per one or several link rows.

The specific shape of the magnet storing blind hole of the synthetic resin link module used in the conveyor chain of the invention may be any shape as long as the magnet piece can be insertably stored in the chain width direction from the link side surface of the magnetism generating link module and the sectional shape of the magnet storing blind hole may be rectangular or circular.

The specific shape of the magnet anchoring portion projecting within the magnet storing blind hole in the conveyor chain of the chain may be any shape as long as a gap is assured in the major part between the magnet piece and the magnet storing blind hole. That is, steps may be provided at four corners in the magnet storing blind hole having the rectangular shape in section or projections may be provided on an inner surface of the magnet storing blind hole having a circular shape in section.

The specific material of the magnet piece used in the conveyor chain of the invention may be any material as long as it is a permanent magnet capable of maintaining a magnetic force required for attracting and retaining the articles, such as a rare-earth magnet, a ferrite magnet and the like. It is also possible to adopt a neodymium magnet whose residual magnetic flux density and holding force are high and which is weak to temperature changes.

Still more, the specific shape of the magnet piece may be any shape as long as it can be stored in the magnet storing blind hole, such as a rectangular parallelepiped magnet piece, a bar-like magnet piece or several plate-like magnet pieces.

The specific size of the magnet piece can be appropriately selected depending on size of the articles to be conveyed, configuration of conveyance, a required magnetic attracting force and others.

The specific material of the link pin used in the conveyor chain of the invention may be any one of steel members, aluminum members and synthetic resin members.

As for the specific mode of use of the conveyor chain of the invention, the conveyor chain may be used not only in a conveyor line in which articles are conveyed horizontally, but also in a conveyor line conveying on a slope including the horizontal conveyor line.

It is noted that the articles to be conveyed applicable to the conveyor chain of the invention may be any articles, it is needless to say that it is preferable to be articles that can be attracted by the magnetic force or articles stored in conveying containers that can be attracted by the magnetic force because the conveyor chain of the invention can conveying the articles even if the conveyor surface is sloped or slippery.

What is claimed is:

1. A conveyor chain comprising:
   a plurality of link rows each having a predetermined chain width and being composed of a plurality of synthetic resin link modules disposed in a chain width direction, each link row having a loading portion for loading articles to be conveyed and hinge portions projecting from front and rear parts of said loading portion;
   wherein the plurality of link rows are linked together in a predetermined array pattern by linking the plurality of link rows in a chain longitudinal direction by inserting link pins through pin inserting holes formed through said hinge portions of the synthetic resin link modules of said link rows,
   wherein the plurality of synthetic resin link modules include a pair of non-magnet storing resin link modules and at least a pair of magnet storing resin link modules which have magnet storing blind holes which open in the chain width direction from link side surfaces of said magnet storing resin link modules, wherein the non-magnet storing resin link modules do not have magnet storing blind holes and wherein the link side surfaces of the magnet storing resin link modules each abut a side surface of a non-magnet storing resin link module; and
   wherein magnet pieces are insertably stored in said magnet storing blind holes of and are operable to magnetically attract and retain said articles, the magnet pieces being enclosed in the magnet storing blind holes by the side surfaces of the non-magnet storing resin link module adjacently disposed in the chain width direction to a magnet storing resin link module, the non-magnet storing resin link covering the magnet storing blind holes with the magnet pieces housed therein so as to secure the magnet pieces in the magnet storing blind holes.

2. The conveyor chain according to claim 1, wherein the non-magnet storing resin link module engages with a sprocket.

3. The conveyor chain according to claim 2, wherein a thickness of the loading portion between a loading surface for loading the articles and said magnet storing blind hole of said magnet storing resin link module is thinner than a thickness between a back surface of said loading surface and said magnet storing blind hole.

4. The conveyor chain according to claim 1, wherein said magnet piece is composed of a square rod having a rectangular shape in section; and
   magnet anchoring portions for anchoring corners of said magnet piece project within said magnet storing blind hole.

5. The conveyor chain according to claim 2, wherein said magnet piece is composed of a square rod having a rectangular shape in section; and
   magnet anchoring portions for anchoring corners of said magnet piece project within said magnet storing blind hole.

6. The conveyor chain according to claim 3, wherein said magnet piece is composed of a square rod having a rectangular shape in section; and
   magnet anchoring portions for anchoring corners of said magnet piece project within said magnet storing blind hole.

7. A synthetic resin magnetism generating link module for a conveyor chain formed of a plurality of synthetic resin link modules arranged in a plurality of link rows having a predetermined chain width, wherein the plurality of link rows are linked together in a predetermined array pattern by linking the plurality of link rows in a chain longitudinal direction, the synthetic resin magnetism generating link module comprising:
   a loading portion for loading articles to be conveyed on the conveyor chain;
   hinge portions projecting from front and rear parts of said loading portion, the hinge portions having pin inserting holes formed therein which are used to link the plurality of link rows by inserting link pins in the pin inserting holes of the synthetic resin link modules of each link row;
   magnet storing blind holes which open in the chain width direction from a link side surface of the synthetic resin link module; and
   magnet pieces which are insertably stored in said magnet storing blind holes and which are operable to magnetically attract and retain articles on the conveyor chain, the magnet pieces being enclosed in the magnet storing blind holes by the link side surface of an adjacent synthetic resin link module in the link row, the adjacent synthetic resin link module being a driving link module which does not store the magnet piece but which engages with a sprocket.

8. The synthetic resin link module according to claim 7, wherein a thickness of the loading portion between a loading surface for loading the articles and said magnet storing blind hole is thinner than a thickness between a back surface of said loading surface and said magnet storing blind hole.

9. The synthetic resin magnetism generating link module according to claim 7, wherein said magnet piece is composed of a square rod having a rectangular shape in section; and wherein the synthetic resin link further comprises a magnet anchoring portions for anchoring corners of said magnet piece project within said magnet storing blind hole.

10. The synthetic resin magnetism generating link module according to claim 8, wherein said magnet piece is composed of a square rod having a rectangular shape in section; and wherein the synthetic resin link further comprises a magnet anchoring portions for anchoring corners of said magnet piece project within said magnet storing blind hole.

* * * * *